US005630226A

United States Patent [19]

Kanda et al.

[11] Patent Number: 5,630,226

[45] Date of Patent: May 13, 1997

[54] LOW-NOISE DOWNCONVERTER FOR USE WITH FLAT ANTENNA RECEIVING DUAL POLARIZED ELECTROMAGNETIC WAVES

[75] Inventors: Minoru Kanda; Mikio Komatsu; Naoki Ao; Kyoji Masamoto; Yoshitaka Kimura, all of Kadoma, Japan

[73] Assignee: Matsushita Electric Works, Ltd., Osaka, Japan

[21] Appl. No.: 353,050

[22] Filed: Dec. 9, 1994

Related U.S. Application Data

[63] Continuation-in-part of Ser. No. 270,845, Jul. 5, 1994.

[30] Foreign Application Priority Data

| | | | |
|---|---|---|---|
| Jul. 15, 1991 | [JP] | Japan | 3-172871 |
| Jul. 15, 1991 | [JP] | Japan | 3-172872 |
| Jul. 15, 1991 | [JP] | Japan | 3-172886 |
| Oct. 25, 1991 | [JP] | Japan | 3-279889 |
| Jan. 9, 1992 | [JP] | Japan | 4-2264 |
| Jan. 9, 1992 | [JP] | Japan | 4-94662 |

[51] Int. Cl.$^6$ .......... H04B 1/18

[52] U.S. Cl. .......... 455/313; 343/756; 455/333

[58] Field of Search .......... 455/313, 319, 455/323, 325, 333; 343/756, 701, 778, 700 MS

[56] References Cited

U.S. PATENT DOCUMENTS

| | | | |
|---|---|---|---|
| 4,596,047 | 6/1986 | Watanabe | 455/328 |
| 4,709,240 | 11/1987 | Bordenave | 343/772 |
| 4,888,597 | 12/1989 | Rebiez et al. | 343/778 |
| 4,956,864 | 9/1990 | Brockman | 455/316 |
| 4,959,873 | 9/1990 | Flynn et al. | 455/303 |
| 5,043,683 | 8/1991 | Howard | 343/756 |
| 5,083,132 | 1/1992 | Kanada et al. | 343/700 MS |
| 5,125,109 | 6/1992 | Geller | 455/313 |
| 5,323,064 | 6/1994 | Bacon | 455/333 |
| 5,471,664 | 11/1995 | Kim | 455/323 |

FOREIGN PATENT DOCUMENTS

| | | |
|---|---|---|
| 62-181007 | 11/1987 | Japan . |
| 1-51102 | 6/1988 | Japan . |
| 1-133801 | 9/1989 | Japan . |
| 2-63201 | 3/1990 | Japan . |
| 1-34003 | 5/1990 | Japan . |
| 2-223201 | 9/1990 | Japan . |
| 2-62703 | 10/1990 | Japan . |
| 3-36243 | 4/1991 | Japan . |
| 3-228401 | 10/1991 | Japan . |

*Primary Examiner*—Leslie Pascal
*Attorney, Agent, or Firm*—Kenyon & Kenyon

[57] ABSTRACT

A low-noise-block downconverter (LNB) for use with flat antennas receiving dual polarized electromagnetic waves includes a body case mounted to a rear side surface of the flat antenna, the body case having two wave guide input ports corresponding to wave guide apertures of the antenna and enclosing a selective device alternatively allowing either one of two outputs corresponding to two different type polarized electromagnetic waves received.

4 Claims, 8 Drawing Sheets

LOW-NOISE DOWNCONVERTER FOR USE WITH FLAT ANTENNA RECEIVING DUAL POLARIZED ELECTROMAGNETIC WAVES

This is a continuation-in-part of U.S. patent application Ser. No. 08/270,845, filed on Jul. 5, 1994 by Kanda et al.

FIELD OF THE INVENTION

The present invention relates to a low-noise-block downconverter (hereinafter referred to as "LNB") for use with flat antennas designed for receiving dual polarized electromagnetic waves employed in the reception of satellitic broadcast waves or for satellite communication and, more particularly, to an LNB which can execute frequency conversion of received signals of two different polarized electromagnetic waves and can alternatively provide as an output either one of the received signals.

BACKGROUND INFORMATION

In satellitic broadcast wave reception or satellite communication, generally, there has been employed a communication method for transmitting different sorts of information with different polarized electromagnetic waves used in respect of waves of the same frequency for the purpose of effective utilization of the frequency. In the case of, for example, circularly polarized electromagnetic waves, it is possible to transmit the different sorts of information with a left handed polarized electromagnetic wave and a right handed polarized electromagnetic wave or, in the case of linearly polarized electromagnetic waves, the transmission of the different sorts of information can be made with a horizontally polarized electromagnetic wave and a vertically polarized electromagnetic wave. Here, it becomes necessary for receiving the two different polarized electromagnetic waves to render a receiving system to be of a simultaneous-dual type, employing two single polarized electromagnetic wave receiving LNBs, or to be of a switchable-dual type with a polarizer means additionally provided to a single, polarized electromagnetic wave receiving LNB.

However, there has arisen a problem that the on current use of the two single polarized electromagnetic wave receiving LNBs or the provision of the polarizer means with respect to the single polarized electromagnetic wave receiving LNB renders the external formation of the LNB to be excessively larger and the entire weight of the device to also be larger. This problem has been particularly remarkable in the case where an LNB is applied to a flat antenna, where compactness, thinness and lightness are critical.

In the dual polarized electromagnetic wave receiving LNB, further, the frequency conversion is executed preferably with a locally oscillated signal from a local oscillator utilized for lowering the frequency of the received signals, and the received signals subjected to the frequency conversion for the respective polarized electromagnetic waves are alternatively provided as the output. In this arrangement of employing the local oscillator for the frequency conversion, on the other hand, it is unavoidable that the locally oscillated signals from the local oscillator will partly leak to the input side and to the output side as well. Taking into account any external influence thereof, such partial leakage of the locally oscillated signals should preferably be reduced as much as possible, and the leakage signal to the input side in particular is required to be sufficiently restrained since such signal is caused to be radiated through the antenna.

Generally, in the dual polarized electromagnetic wave receiving LNB of the type referred to, there are employed microstrip lines in an interior circuit, and it is known that the locally oscillated signals leak through the microstrip lines to the input side and also propagate through the interior space of the LNB. In the interior circuit, therefore, metal plates are provided between respective constituent elements as partitions for dividing the interior space into a plurality of regions mutually separated so as to restrain the spatial propagation of the locally oscillated signals. In an event where respective means for processing the polarized wave signals received include a radio frequency amplifier, it has been ascertained that there arises a variation in the signal transmission characteristics between occasions where each of the radio frequency amplifiers does and does not operate to alternately provide the output, and the problem remains that the received signals are caused to partly leak to the input side.

There have been disclosed converters to which the two different polarized electromagnetic waves are input, in Japanese Utility Model Laid-Open Publication No. 62-181007 of R. Sato; Japanese Utility Model Laid-Open Publication No. 1-133801 of K. Kajita; Japanese Patent Laid-Open Publication No. 2-63201, corresponding to British Patent Applications Nos. 88 16273.0 and 89 01278.5 of S. J. Flin et al.; Japanese Patent Laid-Open Publication No. 2-223201, corresponding to British Patent Application No. 88 16276.3 of K. R. Haward; Japanese Utility Model Laid-Open Publication No. 3-36243 of R. Koiso; and Japanese Patent Laid-Open Publication No. 3-228401. In any one of these prior art references, however, there has been disclosed no converter which satisfies the demands of compactness, thinness and lightness.

SUMMARY OF THE INVENTION

Accordingly, it is an object of the present invention to provide a low-noise-block downconverter for use with a flat antenna receiving dual polarized electromagnetic waves, which is made compact, thin and light and is capable of effectively preventing any signal leakage upon frequency conversion of the received signals.

According to the present invention, this object can be realized by means of a low-noise-block downconverter for use with a flat antenna receiving dual polarized electromagnetic waves, wherein the downconverter comprises a case body mounted to a rear side surface of said flat antenna; a pair of input ports provided in said case body so as to correspond respectively to wave guide apertures of said flat antenna for receiving radio frequency signals of said polarized electromagnetic waves of two different types transmitted from an artificial satellite; a selective means disposed in said case body for allowing an alternative one of said radio frequency signals of each of said two different types of polarized electromagnetic waves received to pass there through in accordance with the magnitude of a DC voltage supplied from a DC power source; means disposed in said case body for converting the frequency of said radio frequency signals of said selected one of the polarized electromagnetic waves received; and a printed-circuit board divided into two blocks of a low-noise amplifier section including said radio frequency signal selective means and a frequency converter section including a local oscillator circuit, said amplifier section and converter section being disposed respectively on each of both side surfaces of a partition which divides the interior space of said case body into front and back spaces; and wherein said pair of input ports are disposed in a mutually right angled relationship with respect to their longitudinal axes.

Other objects and advantages of the present invention shall become clear as the description of the invention advances as detailed with reference to embodiments of the invention shown in accompanying drawings.

DETAILED DESCRIPTION OF THE DRAWINGS

Figure 4:
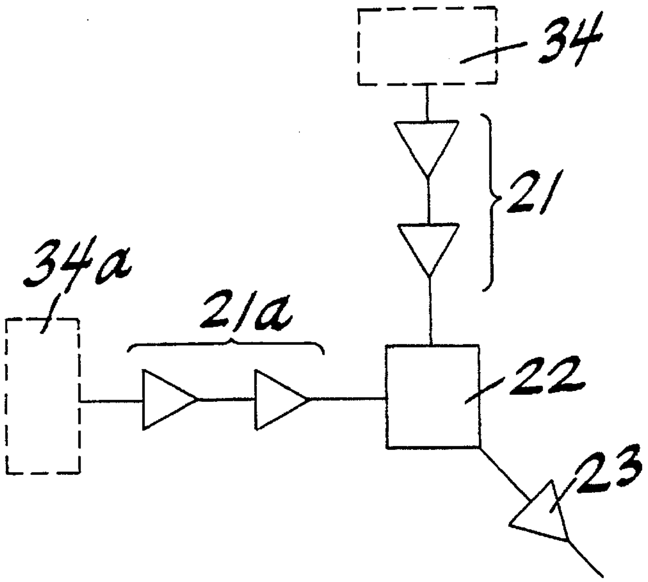
FIG. 4 is a block diagram of a circuit employed in the LNB of FIG. 1.

While the present invention shall now be described in detailed with reference to the respective embodiments shown in the drawings, it will be appreciated that it is not intended to limit the invention only to the embodiments shown but rather to include all alterations, modifications, and equivalent arrangements possible within the scope of the claims.

Figure 1:
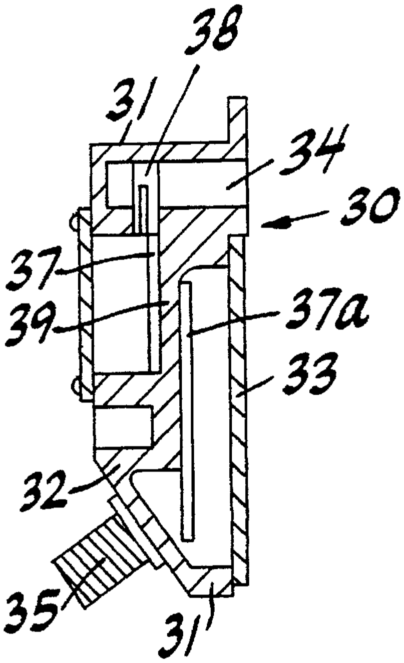
FIG. 1 is a vertically sectioned view in an embodiment of the LNB for use with the flat antenna receiving dual polarized electromagnetic waves according to the present invention.
Figure 2:
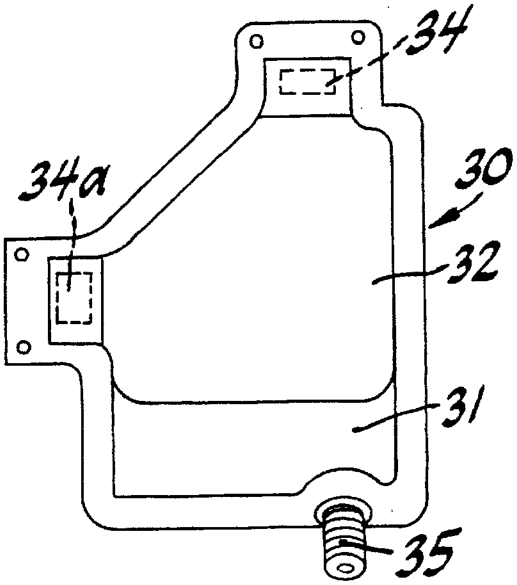
FIG. 2 is a rear side view of the LNB of FIG. 1.
Figure 3:
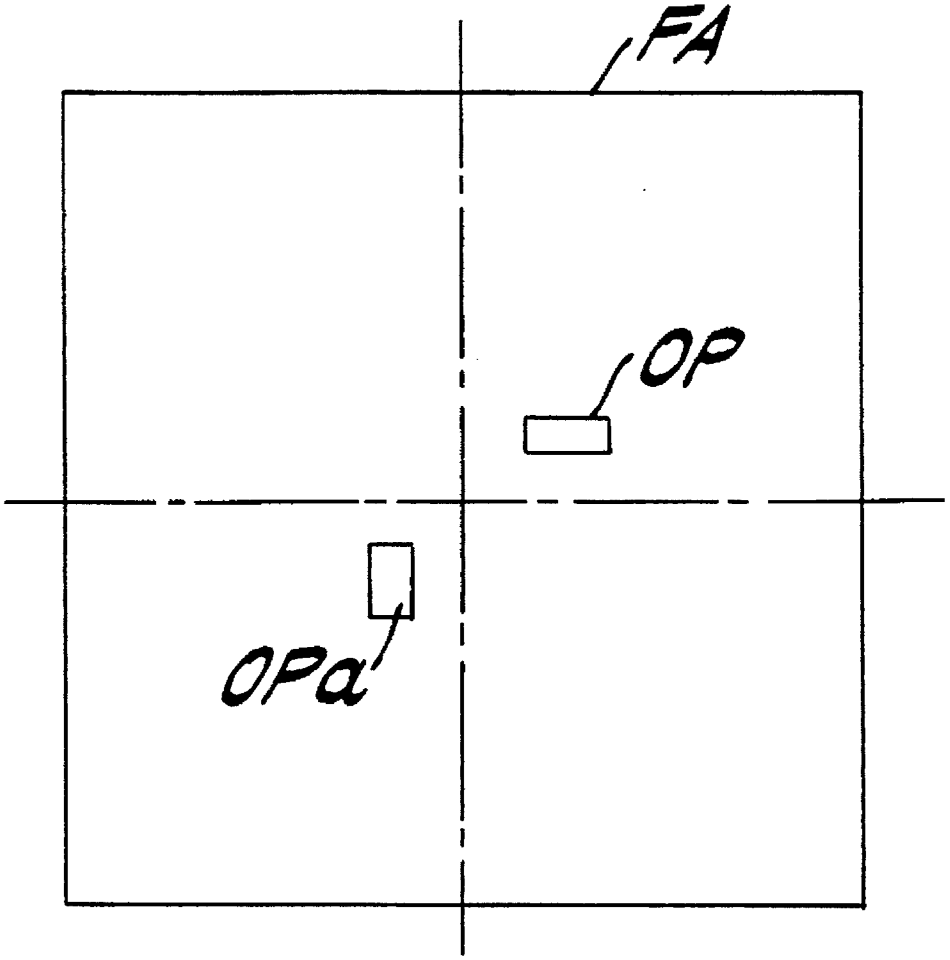
FIG. 3 is an explanatory rear-side plan view of the flat antenna with which the LNB of FIG. 1 is used.

Referring to FIGS. 1 and 2, there is shown an LNB 30, in accordance with the present invention, for use with a flat antenna receiving dual polarized electromagnetic waves. The LNB 30 comprises a case body 31 formed to be generally flat, while this case body 31 is formed with, for example, a casing 32 opened on one side and a bottom plate 33 fitted to the open side of the casing 32. The case body 31 is provided for mounting to a rear side surface of such flat antenna FA as schematically shown in FIG. 3 so that a pair of input ports 34 and 34*a* opened on the side of the bottom plate 33 will be coupled to wave guide apertures OP and OPa formed in the rear side of the flat antenna FA for leading received polarized electromagnetic waves from the antenna FA into the LNB 30. Each of the input ports 34 and 34*a* is formed in a rectangular shape as viewed in its depth direction and has a longitudinal or major axis and a latitudinal or minor axis. The input ports 34 and 34*a* are disposed so that their longitudinal axes are perpendicular to each other. The case body 31 is provided on a side opposite to the side having one input port 34 with an output connector 35 projecting for direct connection with a coaxial cable (not shown) to be connected to an associated receiver. Inside the casing 32 of the case body 31, a printed-circuit board carrying a circuit effectively employed according to the present invention is provided.

According to the present invention, the printed-circuit board is divided into two blocks, one of which is a low-noise amplifier section 37 including a radio frequency signal selective means and the other of which is a frequency converter section 37*a* including a local oscillation circuit. The printed-circuit board sections 37 and 37*a* are secured respectively to each of both side surfaces of a partition 39 formed in the case body 32 so as to divide the interior space of the case body into front and back spaces, and, thus, to dispose each of the printed-circuit board sections 37 and 37*a* in each of the front and back spaces while the printed-circuit board sections 37 and 37*a* are disposed to mutually overlap at least partly in a plan view, so that a dimensional minimization of the case body 31 can be realized in a mounting plane of the rear side surface of the flat antenna FA. Further, by the division of the printed-circuit board into the two blocks of the low-noise amplifier section 37 and the frequency converter section 37*a*, it is thus possible to reduce any leakage of local oscillation signals to input terminals and, in addition, to employ a relatively inexpensive material as a substrate for the printed-circuit board of the frequency converter section 37*a*, in contrast to the amplifier section 37, thereby reducing manufacturing costs. To the printed-circuit board, in addition, there are provided feeding probes 38 to be disposed respectively in each of the input ports 34 and 34*a*, while only one of such probes 38 is shown in the drawings.

For the LNB according to the present invention, further, a circuit such as that shown in FIG. 4 can preferably be employed. More specifically, the polarized electromagnetic wave signals led in respectively from the input ports 34 and 34*a* through amplifiers 21 and 21*a* formed by such radio frequency transistors as a high electron mobility transistor (which shall be simply referred to as "HEMT" hereinafter), or the like, are subjected properly to a selection at a selective means 22 which allows alternately one of the two different polarized electromagnetic waves to pass there through. The polarized electromagnetic wave passed through the elective means 22 is caused to be provided, through an amplifier 23 and a circuit (not shown) connected to a next stage thereof, to the output connector 35 for transmission through the coaxial cable eventually to the receiver.

It will be appreciated here that, according to the foregoing LNB of FIGS. 1 and 2, an alternative one of the two different polarized electromagnetic waves can be propagated to the receiver without requiring a concurrent provision of another LNB or any addition of remarkable size arrangement, sufficiently realizing, in particular, compactness, thinness and lightness. Referring to the radio frequency signal selective means included in the low-noise amplifier section 37, the particular means allows a selected one of the dual polarized electromagnetic waves to pass there through in accordance with the magnitude of the DC voltage of a DC power source supplied from the side of the associated receiver to the downconverter.

Figure 5:
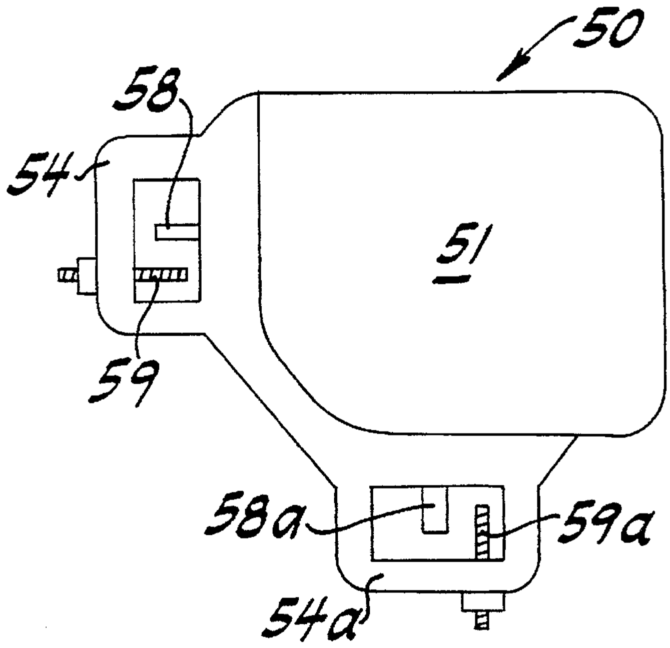
FIG. 5 shows in a plan view another embodiment of the LNB according to the present invention.
Figure 6:
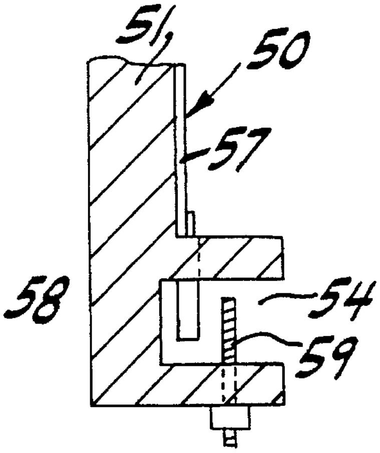
FIG. 6 is an enlarged, fragmentary sectioned view of the LNB of FIG. 5.

Referring next to another embodiment of the present invention, shown in FIGS. 5 and 6, an LNB 50 of this embodiment comprises a flat case body 51 which has two input ports 54 and 54*a* disposed substantially at a right angled relationship to each other. Each of the input ports 54 and 54*a* is provided, as is clear from FIG. 6, in the form of a recess opened on the front side to be in match with the respective wave guide apertures in the rear side of the flat antenna FA. Power supplying probes 58 and 58*a* extending from the printed-circuit board 57 on the front side of the case body 51 are disposed to project in the input ports 54 and 54*a*, and adjusting screws 59 and 59*a* are mounted to the input ports 54 and 54*a* to be drivable forward and backward within the recesses of the input ports 54 and 54*a*.

In the foregoing arrangement, the respective input ports 54 and 54*a* are formed to be rectangular in section, with narrower side surfaces forming an E plane and wider side surfaces forming an H plane, and the adjusting screws 59 and 59*a* are provided to be parallel to the E plane and to be properly adjustable in their projection with respect to the input ports 54 and 54*a* along the H plane, so that an optimum transmission characteristics can be obtained with the projection of the adjusting screws 59 and 59*a* into the recesses of the input ports 54 and 54*a* effectively adjusted.

Figure 8:
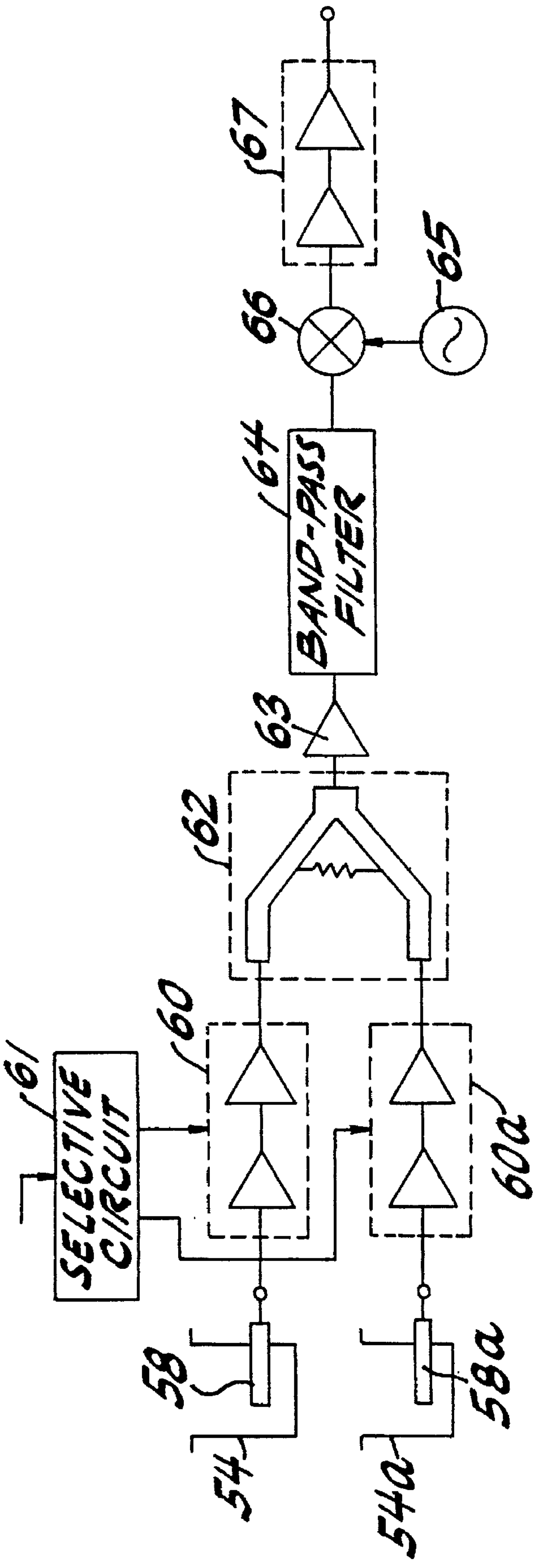
FIG. 8 is a block diagram of a circuit employed in the LNB of FIG. 5.

As shown in FIG. 8, the polarized electromagnetic wave signals led into the input ports 54 and 54*a* are provided through the probes 58 and 58*a* to radio frequency amplifier circuits 60 and 60*a*, respectively, but power is supplied to an alternative one of the radio frequency amplifier circuits 60 and 60*a* by means of a selective circuit 61 so that only either one of the circuits 60 and 60*a* is to be operated. The polarized electromagnetic wave signal amplified by either one of the radio frequency amplifier circuits 60 and 60*a* is provided through a coupler 62 to another radio frequency amplifier circuit 63 to thereby be amplified and, then, to a band-pass filter 64 for rejecting image band frequency. At a frequency conversion means formed by a local oscillation circuit 65, a mixer 66, the signal is mixed with a locally oscillated signal to be subjected to a predetermined frequency conversion, and the frequency converted signal is provided as an output after being amplified at an intermediate frequency amplifier circuit 67.

Figure 7:
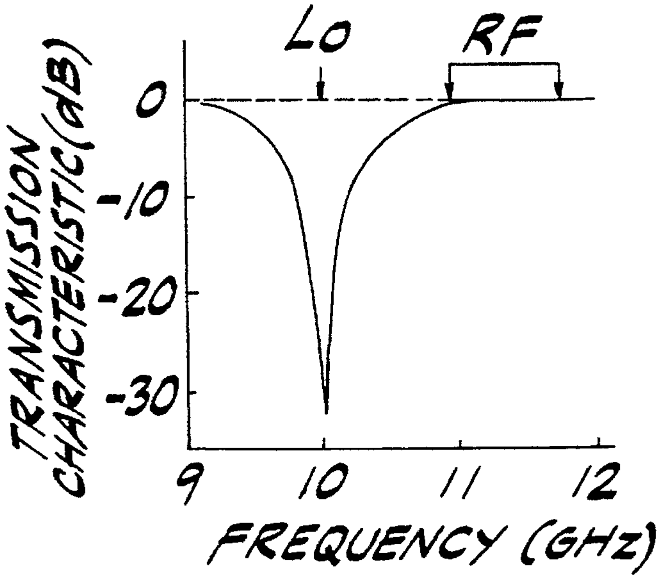
FIG. 7 is a diagram showing operational characteristics of the LNB of FIG. 5.

According to the above described embodiment of FIGS. 5 to 8, it is possible to attain further compactness, thinness and lightness than in the case of the foregoing embodiment of FIGS. 1 to 4, and to adjust the transmission characteristics in accordance with the forward or backward projection of the adjusting screws 59 and 59*a*, with respect to the input ports 54 and 54*a*, so that once the center frequency of the leakage preventing band is made to coincide with the locally oscillated signal Lo, only the locally oscillated signal Lo can be easily attenuated by about 30 dB without substantially influencing the transmission characteristics of the received signal RF, as seen in FIG. 7. It is eventually possible to prevent the locally oscillated signal from partly leaking to the input side, and more remarkably to prevent the signal from being radiated through the antenna into the air.

Figure 9:
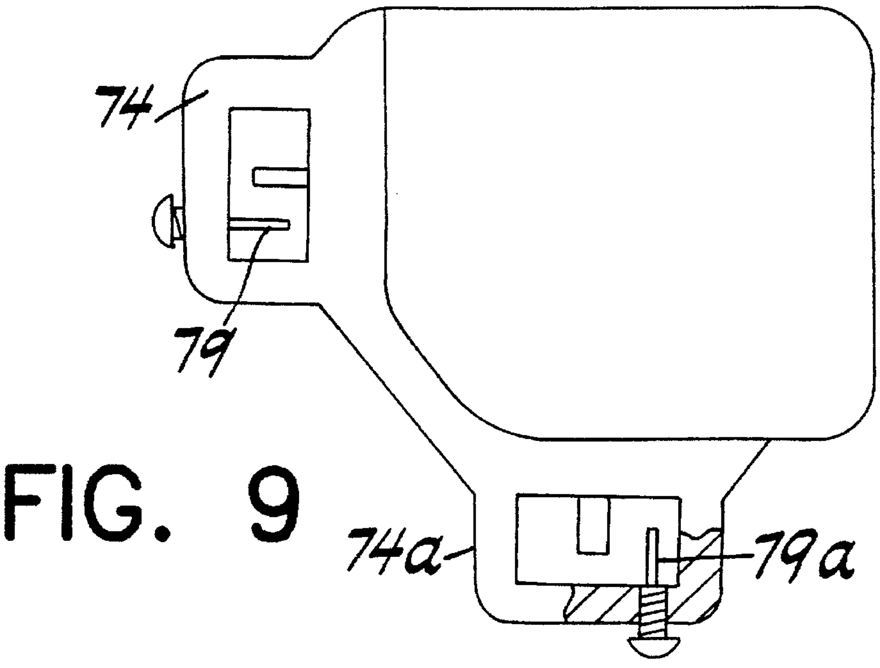
FIG. 9 shows in a plan view another embodiment of the LNB according to the present invention.
Figure 10A:
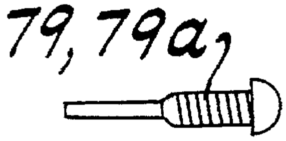
FIGS. 10*a* and 10*b* are magnified views of an adjusting screw employed in the LNB of FIG. 9.
Figure 10B:
Figure 11:
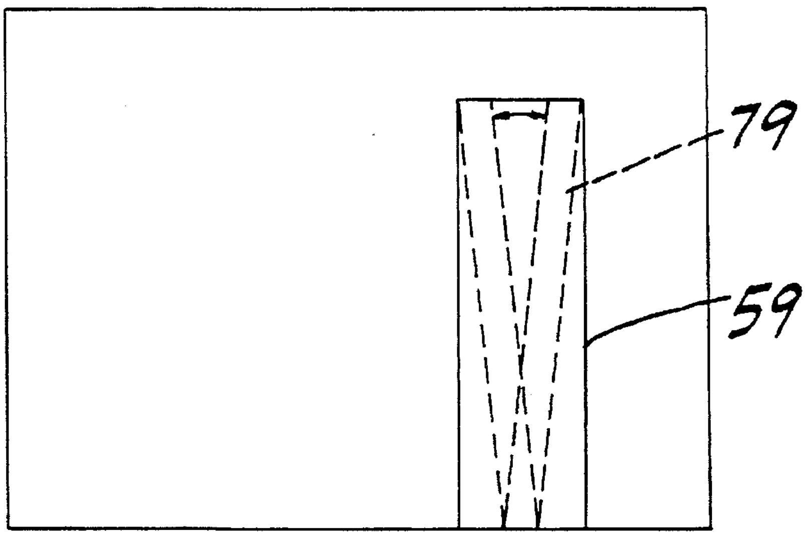
FIG. 11 is an explanatory view for the operation of the LNB of FIG. 9.

In still another embodiment of the present invention, shown in FIGS. 9 and 10*a*, the adjusting screws 79 and 79*a* mounted to the input ports 74 and 74*a* for the forward and rearward driving are thinner at the part projecting into the recess than at the threaded base part for the drivable mounting, so as to be about 1 to 1.5 mm, for example, in diameter. With this arrangement, which is used generally with a resin applied to the whole of the adjusting screws 79 and 79*a* for their sealing and fixation, it is possible to reduce the required amount of resin to be applied and also to reduce the required driving extent of the screws for their easier mounting, since the thinner projecting part of each screw renders the effective length of the threaded part shorter. In this case, the projecting parts of the screws may be tapered or made conical to be sharpened end wise, as shown in FIG. 10*b*. Further, even when the thinner projecting parts of the adjusting screws 79 and 79*a* are caused to rock or bend, as shown by dotted lines in FIG. 11, due to an external vibration or shock imparted to the LNB after adjustment of the screws 79 and 79*a*, the stroke of such rocking or bending will be substantially within an extent corresponding to the diameter of the projecting part of the adjusting screw 59 employed in the embodiment of FIGS. 5–8, as shown by a solid outline in FIG. 11, so that the resultant variation in transmission characteristics will be small and a stable operation can be expected with respect to transmission. In the present embodiment, other structural and functional features are substantially the same as those in the foregoing embodiment of FIGS. 5–8.

Figure 12:
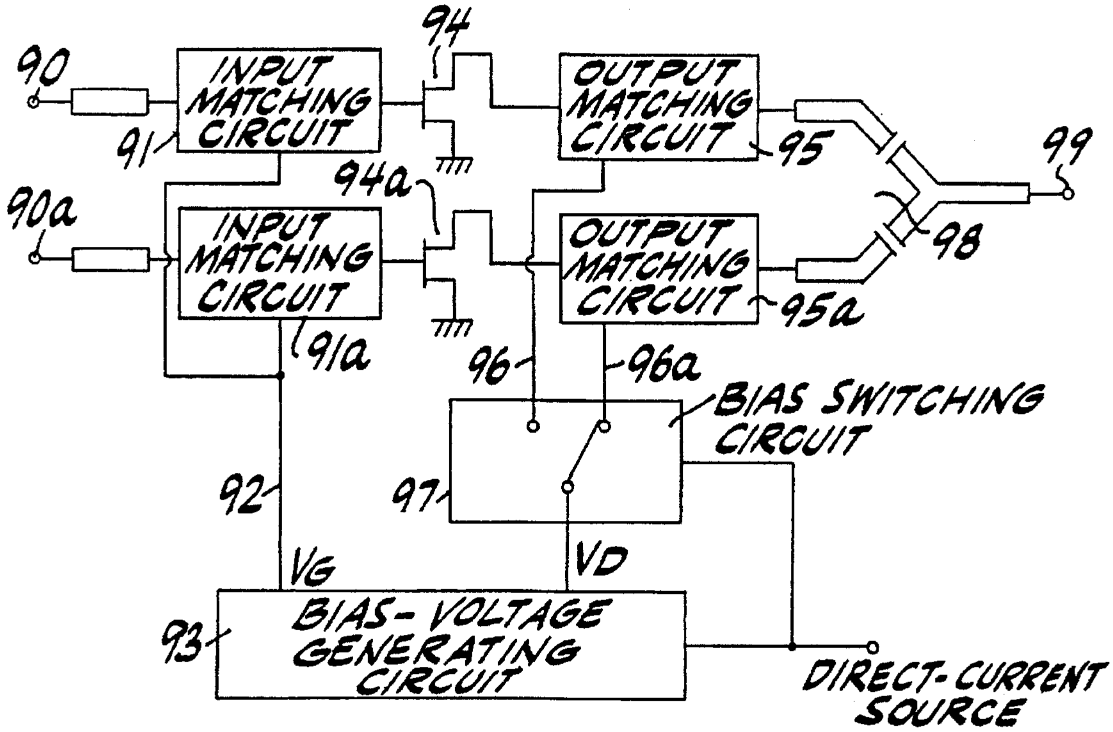
FIG. 12 is a block diagram of a circuit employed in another embodiment of the LNB according to the present invention.

In another embodiment shown in FIG. 12, there is employed a further useful selective means. More specifically, there are connected to input terminals 90 and 90*a* such low noise amplifiers that respectively comprise each of input matching circuits 91 and 91*a* to which a voltage is constantly applied through a gate bias circuit 92 from a bias-voltage generating circuit 93, low noise FETs (Field Effect Transistors) or HEMTs 94 and 94*a*, and output matching circuits 95 and 95*a* to either one of which a bias voltage is applied from the bias-voltage generating circuit 93 through a bias switching circuit 97 and through either one of drain bias circuits 96 and 96*a* which is turned on by the circuit 97. An output from either one of the output matching circuits 95 and 95*a* is provided through a coupling circuit 98 to an output terminal 99.

Figure 13:
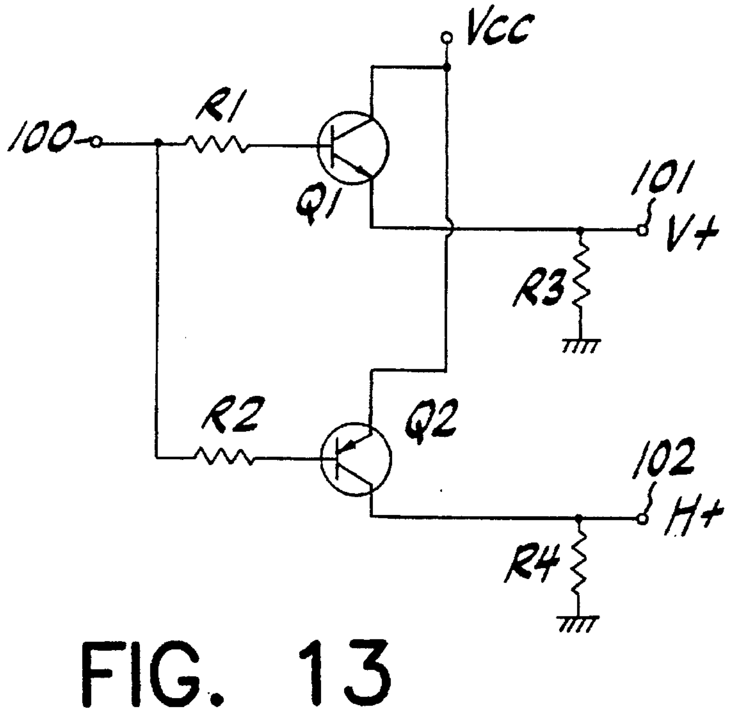
FIG. 13 is a circuit diagram of a bias switching circuit used in the circuit of FIG. 12.

In the aforementioned bias switching circuit 97, shown in greater detail in FIG. 13, there is provided to an input terminal 100 a binary input voltage having a HIGH or LOW level. Upon application of a HIGH level to the input 100, a transistor Q1 is actuated through a resistor R1 and a positive voltage is generated at an output terminal 101, while another transistor Q2 is not actuated, thus generating no voltage at another output terminal 102. Upon application of a LOW level to the input 100, the transistor Q2 is actuated through a resistor R2, and a positive voltage is generated at the output terminal 102, while the transistor Q1 is not actuated and no voltage is generated at the output terminal 101.

Thus, the polarized electromagnetic wave signal at only one of the input terminals 90 and 90*a* is amplified, and the output is provided out of the output terminal 99, upon which the gate bias constantly applied to the low noise FETs 94 and 94*a* can be effective to prevent these FETs from being electrically damaged.

Figure 14:
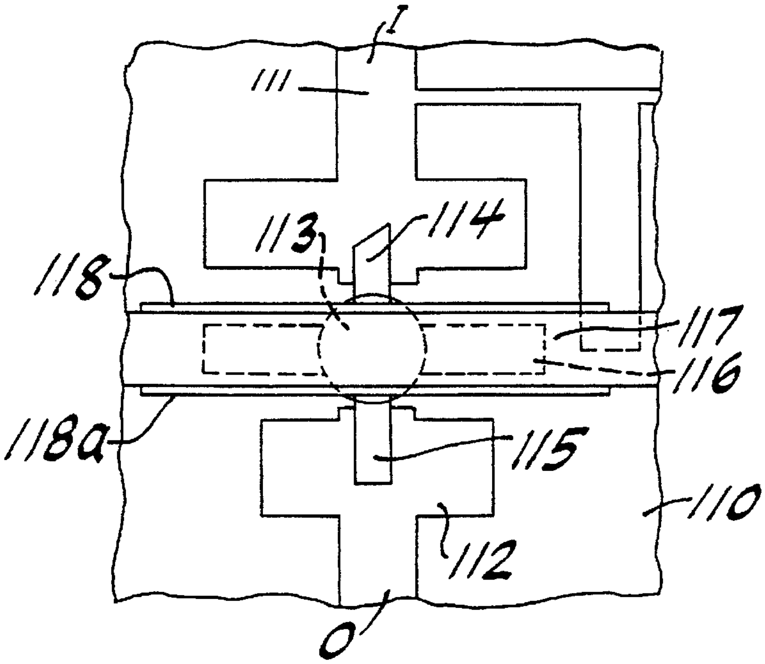
FIG. 14 shows in a fragmentary plan view another embodiment of the LNB according to the present invention.
Figure 15:
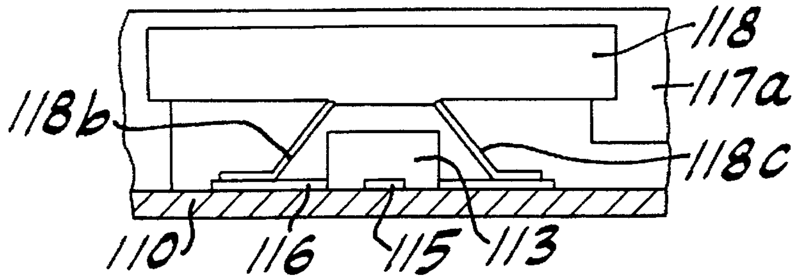
FIG. 15 is a fragmentary side view of the LNB of FIG. 14.
Figure 16:
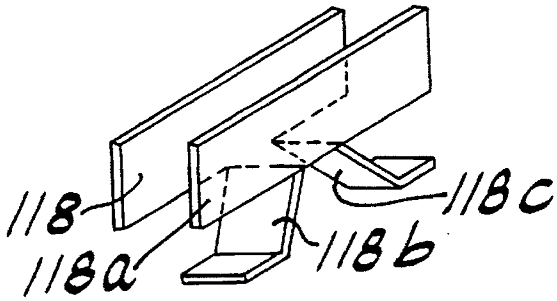
FIG. 16 shows in a perspective view a member employed in the LNB of FIG. 14.

In another embodiment of the LNB according to the present invention, there is employed a circuit including a useful radio frequency amplifier such as shown in FIGS. 14 to 16. In this radio frequency amplifier, a dielectric substrate 110 carries thereon a desired conductor pattern for forming a conductive land 111 having an input end I and a conductive land 112 having an output end O. A grounding conductor land is formed between the input side and output side conductor lands 111 and 112. To the input side conductor land 111, in the present instance, an active element 113 comprising an HEMT is connected at its gate electrode 114 while, to the output side conductor land 112, the element 113 is connected at its drain electrode 115, and such source electrode 116 that constitutes a grounding electrode is connected to the grounding conductor land.

Further, a metallic separator 117 is disposed above the active element 113, which separator 117 is preferably formed to be separated at its one leg part 117*a* from the top surface of the dielectric substrate 110, so as to be kept in a non-contacting state with respect to any one of the conductor lands. Further, the separator 117 is held between a pair of parallel holder plates 118 and 118*a* of a supporter, while the holder plates 118 and 118*a* are coupled to each other by a bridging part at their central lower. The bridging part includes a pair of resilient leg leaves 118*b* and 118*c* suspended diagonally downward in mutually opposite directions along the longitudinal direction of the parallel holder plates 118 and 118*a*, and leg leaves 118*b* and 118*c* are brought into resilient contact with the source electrode 116 forming the grounding electrode of the active element 113. In this case, the separator 117 is made to be grounded through the supporter and grounding electrode 116, so that any unnecessary oscillation can be prevented and the amplifier characteristics can be improved. Further, the separator 117 can be fixedly installed in a simple manner by means of the holding plates 118 and 118*a* of the supporter, thereby improving assembly of the amplifier.

Figure 17:
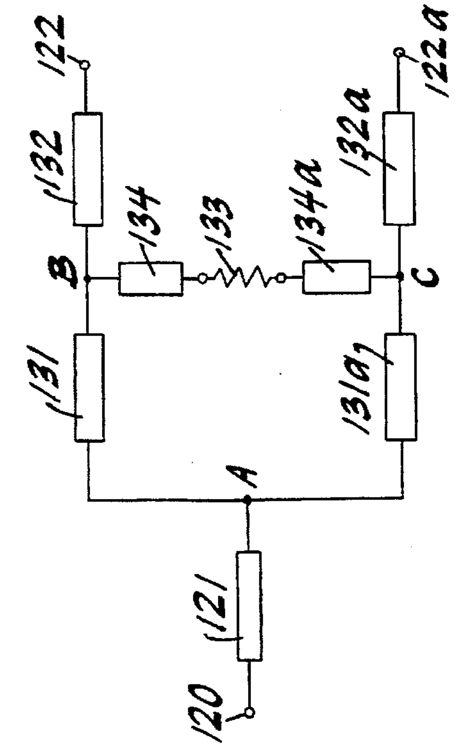
FIG. 17 is a block diagram of a circuit employed in another embodiment of the LNB according to the present invention.

In still another embodiment of the LNB according to the present invention, there is employed a circuit including a coupler such as shown in FIG. 17, which coupler comprises a pair of branch lines 131 and 131*a* made by microstrip lines formed on a dielectric substrate, preferably, the branch lines 131 and 131*a* being joined at their one ends and connected through a junction point A and an output line 121 to an output terminal 120 while connected at the other ends through each of input lines 132 and 132*a*, respectively, to input terminals 122 and 122*a*.

It should be appreciated here that the input and output terminals and lines 122, 122*a*, 132, 132*a* and 120, 131, 131*a* are respectively reversible depending on whether the coupler and the antenna are used for receiving or transmitting electromagnetic waves. Since the downconverter is herein described to be used with a receiving antenna, the pairs of terminals and lines 122, 122*a* and 132, 132*a* are referred to as the input terminals and lines, while the single terminal 120 and the pair of lines 131 and 131*a* are referred to as the output terminal and lines, in conformity to the case of FIG. 8.

Further, between both junction points B and C of the branch lines 131 and 131*a* and the input lines 132 and 132*a*, there is connected an absorbing resistor 133 through additional lines 134 and 134*a*. Here, in a path from the junction point B of the branch line 131 with the additional line 134, to the junction point C of the branch line 131*a* with the additional line 134*a*, a difference in the length when the path is formed through the branch lines 131 and 131*a* and when the path is formed through the additional lines 134 and 134*a* is set to be one half of a wavelength of the polarized electromagnetic wave signal propagated. It will be appreciated that, in the present embodiment, the branch lines are made longer by a length of the additional lines 134 and 134*a*.

Figure 18:
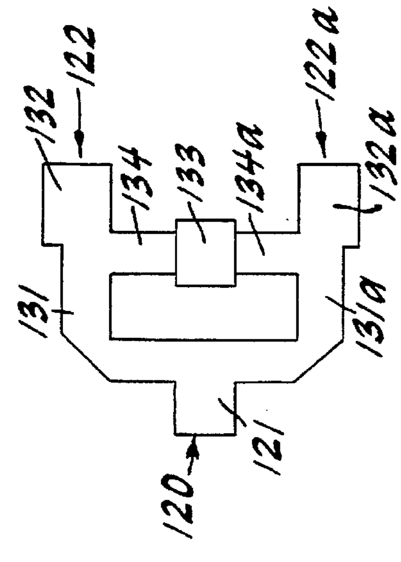
FIG. 18 shows in a plan view a working aspect of a circuit pattern employed in the LNB of FIG. 17.

In forming the foregoing coupler on the dielectric substrate by means of a printed wiring, the same should be formed preferably in such a pattern as shown in FIG. 18, in which pattern the same portions as the circuit elements shown in FIG. 17 are denoted by the same reference numbers as those used in FIG. 17.

Figure 19:
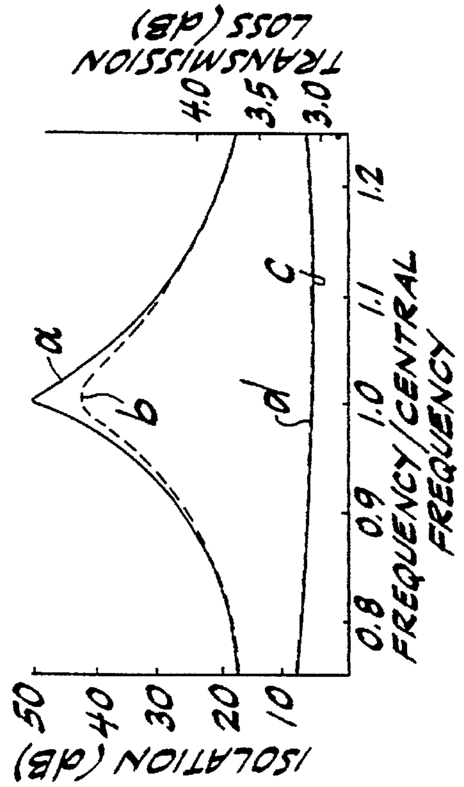
FIG. 19 is a diagram showing the operational characteristics of the LNB in FIG. 17 in comparison with those of a prior art device.

In FIG. 19, there are diagrammatically shown variations in the isolation and transmission loss with respect to the frequency employed in the foregoing coupler. In FIG. 19, the ratio of the polarized electromagnetic wave frequency with respect to the central frequency is taken on the abscissa. The solid line curves "a" and "c" denote the isolation and transmission loss in the case of the present embodiment, whereas dotted line curves "b" and "d" denote the isolation and transmission loss in the case of an aspect having no characteristic arrangement of the present embodiment. From these curves, it has been found that the presence or absence of the characteristic arrangement of the present embodiment does not remarkably influence transmission loss, whereas the present embodiment is successful in attaining an excellent outcome with respect to isolation.

What is claimed is:

1. A low-noise-block downconverter for use with a flat antenna receiving dual polarized electromagnetic waves, comprising:

a case body mounted to a rear side surface of said flat antenna and having a partition dividing an interior space of the case body into front and back spaces;

a pair of input ports provided in said case body so as to correspond respectively to wave guide apertures of said flat antenna for receiving radio frequency signals of said polarized electromagnetic waves of two different types;

a selective means disposed in said case body for allowing an alternative one of said radio frequency signals of each of said two different types of polarized electromagnetic waves received to pass there through in accordance with a magnitude of a DC voltage supplied from a DC power source;

means disposed in said case body for converting the frequency of said radio frequency signals of said selected one of the polarized electromagnetic waves received; and two printed-circuit boards respectively provided with a low-noise amplifier section including said radio frequency signal selective means and with a frequency converter section including a local oscillator circuit, said printed-circuit board of said amplifier section and said printed-circuit board of said converter section being disposed respectively on opposite sides of said partition of said case body so as to respectively lie in said front and back spaces, wherein each of said pair of input ports is formed, as viewed in a depth direction of the port, in a rectangular shape having a longitudinal axis, and wherein the input ports are disposed so that the longitudinal axes of the rectangular shapes of the ports are substantially perpendicular to each other.

2. The downconverter according to claim 1, wherein each of said input ports includes a metallic adjusting screw mounted to retractably project into the port for varying at least one received-wave transmission characteristic, each of said input ports having a narrower side surface defining an plane and a wider side surface defining an H plane perpendicular to said E plane, each of said adjusting screws being arranged parallel to the E plane of the input port and being adjustable in the projection into the input port along the H plane of the input port and each of said adjusting screws having a tip section which is thinner than a threaded base section located adjacent to the screw head.

3. The downconverter according to claim 1, wherein said selective means includes a pair of radio frequency amplifiers, a bias-voltage generating circuit connected to said radio frequency amplifiers and generating a gate bias-voltage which is constantly applied to said radio frequency amplifiers as a gate bias voltage, and a bias switching circuit which turns a drain bias voltage from said bias-voltage generating circuit ON and OFF so as to actuate a selective one of the radio frequency amplifiers.

4. The downconverter according to claim 1 further comprising a coupler as a circuit element, said coupler including a pair of branch lines connected to an input terminal of said coupler, a pair of output lines connected respectively at one end to each of said branch lines and at the other end to each of a pair of output terminals of the coupler, and an absorbing resistor connected between junction points between said pair of branch lines and between said pair of output lines through additional lines, wherein a difference between a path through said branch line and a path through said additional lines is set to be one half of a wavelength of said propagated polarized electromagnetic wave.

* * * * *

UNITED STATES PATENT AND TRADEMARK OFFICE
CERTIFICATE OF CORRECTION

PATENT NO. : 5,630,226

DATED : May 13, 1997

INVENTOR(S) : Minoru KANDA, et al.

It is certified that error appears in the above-indentified patent and that said Letters Patent is hereby corrected as shown below:

Title page, item [54] & Col. 1, change "LOW-NOISE DOWNCONVERTER..." to --LOW-NOISE-BLOCK DOWNCOVERTER...--.

Column 1, line 1, change "LOW-NOISE DOWNCONVERTER..." to --LOW-NOISE-BLOCK DOWNCONVERTER...--.

Column 3, line 53, change "detailed" to --detail--.

Column 4, line 53, change "there through" to --therethrough--.

Column 4, line 54, change "elective" to --selective--.

Column 5, line 1, change "there through to --therethrough--.

Column 5, line 15, change "in" to --into--.

Column 6, line 9, change "end wise" to --endwise--.

UNITED STATES PATENT AND TRADEMARK OFFICE

CERTIFICATE OF CORRECTION

PATENT NO. : 5,630,226

DATED : May 13, 1997

INVENTOR(S) : Minoru KANDA, et al.

It is certified that error appears in the above-indentified patent and that said Letters Patent is hereby corrected as shown below:

Column 8, line 31, change "there through" to --therethrough--.

Column 8, line 59, before "plane" at beginning of line insert --E--.

Signed and Sealed this

Fourteenth Day of October, 1997

Attest:

Bruce Lehman

BRUCE LEHMAN

*Attesting Officer* *Commissioner of Patents and Trademarks*